(12) United States Patent
Yuen

(10) Patent No.: US 11,577,951 B2
(45) Date of Patent: Feb. 14, 2023

(54) SELF-SERVICE WINE TASTING SYSTEM

(71) Applicant: Information Processing Consultants, Ltd., Hong Kong (CN)

(72) Inventor: Chun Wai Yuen, Hong Kong (CN)

(73) Assignee: Information Processing Consultants, Ltd., Hong Kong (CN)

( * ) Notice: Subject to any disclaimer, the term of this patent is extended or adjusted under 35 U.S.C. 154(b) by 313 days.

(21) Appl. No.: 16/884,050

(22) Filed: May 27, 2020

(65) Prior Publication Data

US 2020/0377355 A1 Dec. 3, 2020

(30) Foreign Application Priority Data

May 27, 2019 (CN) .......................... 201920773244.1

(51) Int. Cl.
*B67D 1/08* (2006.01)
*B67D 1/12* (2006.01)
*G06F 3/04812* (2022.01)
*G06K 7/14* (2006.01)

(52) U.S. Cl.
CPC ......... *B67D 1/0888* (2013.01); *B67D 1/1277* (2013.01); *G06F 3/04812* (2013.01); *G06K 7/143* (2013.01); *B67D 2001/0812* (2013.01); *B67D 2210/00049* (2013.01)

(58) Field of Classification Search
CPC ................ B67D 1/0888; B67D 1/1277; B67D 2001/0812; B67D 2210/00049; B67D 2001/0811; B67D 2210/0001; B67D 1/0007; B67D 1/1247; B67D 2210/00089; B67D 2210/00091; G06F 3/04812; G06K 7/143

See application file for complete search history.

(56) References Cited

U.S. PATENT DOCUMENTS

| 10,343,886 | B2* | 7/2019 | Venezia | G06Q 50/12 |
| 2016/0159633 | A1* | 6/2016 | Diffenderfer | B67D 3/0083 |
| | | | | 222/23 |
| 2016/0207752 | A1* | 7/2016 | Bazoberry | A23L 3/3445 |
| 2016/0257554 | A1* | 9/2016 | Manwani | B65D 77/067 |
| 2016/0260155 | A1* | 9/2016 | Landsman | G06Q 30/0631 |
| 2019/0071298 | A1* | 3/2019 | Tomforde | G07F 13/065 |
| 2020/0377355 | A1* | 12/2020 | Yuen | B67D 1/0888 |

* cited by examiner

*Primary Examiner* — Bob Zadeh
(74) *Attorney, Agent, or Firm* — Bayramoglu Law Offices LLC

(57) ABSTRACT

A self-service wine tasting system includes automatic wine dispensers, a cloud server and user terminals. The automatic wine dispenser includes wine dispensing stations, a machine identity and a first telecommunication module. The first telecommunication module is connected to a control chip of the automatic wine dispenser. The cloud server includes a storage and a second telecommunication module. The second telecommunication module is in communication connection with the first telecommunication module. The storage stores wine storage information associated with the machine code of each automatic wine dispenser. The user terminal includes an identification device and a third telecommunication module. The third telecommunication module is in communication connection with the second telecommunication module. The self-service wine tasting system facilitates the wine taster to record the tasting behavior.

8 Claims, 5 Drawing Sheets

SELF-SERVICE WINE TASTING SYSTEM

CROSS REFERENCE TO THE RELATED APPLICATIONS

This application is based upon and claims priority to Chinese Patent Application No. 201920773244.1, filed on May 27, 2019, the entire contents of which are incorporated herein by reference.

TECHNICAL FIELD

The present invention relates to self-service food and beverage apparatus, and more particularly, to a self-service wine tasting system.

BACKGROUND

At present, there are many self-service wine dispensers on the market, which can sell a bottle of wine by glass. The analysis is limited to the sales data. On the other hand, the wine suppliers introduce the products to the wine tasters through wine tasting parties, and obtains feedback from the wine tasters on the products from interviews. Wine tasters usually are offered dozens of wines to taste during the wine tasting party, and each wine has its own characteristics. After a brief introduction, the wine tasters can choose wines to taste according to their personal preferences. If the wine tasting party is facilitated with self-service wine dispensers, the wine tasters can use a value-added card and the value-added card reader of each self-service wine dispenser to choose wines to taste according to their personal preferences. These facilities can only reduce the numbers of wine dispensing staff without helping the wine tasting effect. It is easy for the wine taster to forget the tastes and the name of the wines that they have tasted after tasting many types of wines. Some wine tasters may write down their personal tasting notes on a pocket notebook, or use small programs on a mobile phone to record the wine tasting notes by taking photos of labels on wine bottles. Labels of wines are not necessarily recognized by the program application, therefore, the corresponding data of the wine cannot be obtained. Finally, the tasters cannot reselect their favorite wine after the tasting party due to faded memory and confusion. As a result, it is desirable to provide a device that can help the wine tasters to systematically take the personal tasting records after wine tasting.

SUMMARY

The present invention provides a cloud self-service wine tasting system, which facilitates wine tasters to record wine tasting notes of their tasted wines.

A self-service wine tasting system includes automatic wine dispensers, a cloud server and user terminals.

The automatic wine dispenser includes wine dispensing stations, a machine identity and a first telecommunication module. The first telecommunication module is connected to a control chip of the automatic wine dispenser.

The cloud server includes a storage and a second telecommunication module. The second telecommunication module is in communication connection with the first telecommunication module. The storage stores wine storage information associated with each wine dispensing station of the machine identity of each automatic wine dispenser.

The user terminal includes an identification device and a third telecommunication module. The third telecommunication module is in communication connection with the second telecommunication module.

Preferably, the wine dispensing station includes a display screen and a quick response (QR) code reader. The QR code reader and the display screen are in communication connection with the control chip, respectively. The identification device is a wine tasting QR code. The QR code reader is encoded to identify the wine tasting QR code (the wine tasting QR code includes an activation command to activate the automatic wine dispenser, and the wine tasting QR code can be printed on papers, or displayed on the user terminals, or can be offered by the wine supplier to the wine taster). The control chip transmits the QR code information to the cloud server via the first telecommunication module, and activates the automatic wine dispenser to start to dispense the wine when the identified wine tasting QR code information matches with the pre-stored wine tasting QR code information.

With preferences, the automatic wine dispenser is configured with a plurality of wine dispensing stations. All the wine dispensing stations are corresponding to a solenoid valve and a pump one by one.

One end of the solenoid valve is connected to the control chip.

An inlet of the pump connects with a bottleneck of a wine bottle on the wine dispensing station. An outlet of the pump connects with the solenoid valve of the wine dispensing station. A far end of the solenoid valve from the pump is connected to a wine output valve of the automatic wine dispenser.

With preferences, the user terminal includes a third storage, and the third storage is encoded to store the information input by the wine taster associated with the device identity.

With preferences, the wine dispensing station further includes a flowmeter and a wine empty detection device. The flowmeter and the wine empty detection device are connected to the control chip, respectively.

With preferences, the number of the wine dispensing stations of the automatic wine dispenser is 15-200. Each wine dispensing station is corresponded to a unique machine code.

With preferences, the flowmeter is arranged between the wine output valve and the solenoid valve, and the wine empty detection device is arranged at the bottom of the wine bottle.

With preferences, the display screen is arranged on each wine dispensing station, and the display screen is connected to the control chip.

With preferences, the automatic wine dispenser further includes a wine decanting device. The wine decanting device includes an oxygen tank, a gas pump and an oxygen pipeline. One end of the oxygen pipeline is connected to the oxygen tank, and the other end of the oxygen pipeline is connected to the gas pump.

a gas outlet of the gas pump is connected to a wine output pipeline of the automatic wine dispenser. One end of the wine output pipeline is connected to the wine bottle, and the other end of the wine output pipeline is connected to the wine output valve. The wine decanting device is arranged near the bottleneck of the wine bottle.

With preferences, a plurality of guide pipes are arranged between the gas pump and the wine output pipeline. The plurality of guide pipes are connected to the gas outlet of the gas pump through a main pipeline. A spiral deflector is arranged on the inner wall of the guide pipe and the inner wall of the wine output pipeline. The deflector penetrates the inner wall of the guide pipe and the inner wall of the wine output pipeline, respectively.

A plurality of gas inlets are arranged on the wine output pipeline, and the gas inlet is connected to the guide pipe.

With preferences, a sealing cap is arranged at an end of the wine output pipeline connected to the wine bottle. The sealing cap includes a cap body, a sealing ring and a bolt. The cap body is a cylindrical structure, wherein a first groove is arranged in the cap body. The sealing ring is arranged at the bottom of the first groove, and the sealing ring is a ring structure. The sealing ring is configured to seal the bottleneck of the wine bottle.

With preferences, a plurality of opening holes are arranged at intervals on the cap body along a circumference. A locating block is arranged in each opening hole. A thread is arranged on the outer wall of the cap body along the circumference to fix the bolt.

With preferences, a limiting bump is arranged on both ends of the locating block, and the limiting bump is configured for the locating block to move back and forth in the opening hole. A second groove is arranged at both ends of the opening hole. The second groove is configured to cooperate with the limiting bump when the limiting bump moves back and forth.

With preferences, a first opening for the wine output pipeline to dispense the wine is arranged on the cap body. A second opening is further arranged on the cap body, and the second opening is connected to the gas valve.

The self-service wine tasting system of the present invention includes the following steps.

Wine taster scans the obtained wine tasting QR code by the QR code reader at the wine dispensing station of the automatic wine dispenser, wherein the wine tasting QR code includes the network address of the identifying cloud server and the machine identity of the automatic wine dispenser. The automatic wine dispenser transmits the identified information to the cloud server via the first telecommunication module. The cloud server transmits a wine dispensing command to the automatic wine dispenser corresponding to the machine identity in the wine tasting QR code via the second telecommunication module and the first telecommunication module. The control chip of the automatic wine dispenser controls the wine dispensing station of the automatic wine dispenser to dispense the wine according to the wine dispensing command, so that the wine taster can get the wine to taste.

And then the wine taster uses the own user terminal (a mobile phone, a tablet, and other electronic device) to identify the wine tasting QR code and transmit the identified wine tasting QR code information and the terminal identity of the user terminal to the cloud server.

The storage of the cloud server stores the wine storage information associated with the machine identity of each automatic wine dispensing station and the wine dispensing command associated with the wine tasting QR code.

The cloud server after receiving the identified machine code, the wine tasting QR code information, the user terminal identity, which are transmitted from the user terminal, transmits the wine storage information of the wine dispensing station of the associated machine identity to the user terminal. Then the wine taster gets the wine information, which is about his/her tasting wine. And he/she writes his/her tasting notes. Thereafter, the cloud server receives the messages, transmitted from the user terminal, which include user terminal identity, the tasting QR code, the time of received the tasting QR code, the wine storage information of the automatic dispensing station associated with the machine identity. These are stored as the tasting records of the wine taster into the storage.

Later, if the wine taster wants to know his/her own wine tasting behavior, the wine taster can use the user terminal to transmit an information request to the cloud server via the third telecommunication module and the second telecommunication module. The information request includes the user terminal identity of the user terminal. After receiving the information request, the cloud server searches the wine tasting records associated with the user terminal identity of the information request among the recorded wine tasting records, and transmits the searched wine tasting records to the user terminal via the second telecommunication module and the third telecommunication module, which facilitate the wine taster to obtain their own wine tasting records at any time without recording manually.

In addition, the user terminal can obtain the tasting notes (such as color, aroma, taste and personal preference of the wine) input by the wine taster after tasting, and transmit the tasting notes and the identified machine identity of the automatic wine dispensing station to the cloud server. The cloud server stores the above-mentioned tasting notes together with the wine information, which makes it less likely that the wine taster is confused about the tasting results due to ambiguous records after tasting too many wines, and thereby reducing the mismatches between the wine tasting notes and the tasted wines.

Moreover, the cloud server can generate the user tasting records of the automatic wine dispenser transmitted from the user terminal according to the wine tasting records associated with a machine code. The user tasting record includes the machine code, the receiving time, and the wine storage information corresponding to the machine code, making it convenient for the manager of the automatic wine dispenser to obtain information of the usage of each automatic wine dispenser. And the cloud server can store the above-mentioned tasting notes in the user tasting record, making it convenient for the wine supplier and manager of the automatic wine dispenser to obtain the wine tasters' feedback after tasting the wines of the automatic wine dispenser.

The control chip in the present invention is implemented as a single chip microcontroller. Specifically, the single chip microcontroller is STM32, 32-bit RISC ARM, wherein, STM32 is a family of 32-bit microcontroller integrated circuits by STMicroelectronics, RISC represents reduced instruction set computer, and ARM represents advanced RISC machines. The single chip microcontroller is connected to a plurality of solenoid valves and a plurality of flowmeters which correspond to a plurality of wine dispensing stations. When the single chip microcontroller is connected to the plurality of solenoid valves, each solenoid valve corresponds to a bottleneck of one bottle, achieving physical open or close of the wine bottle. When the control chip receives a wine dispensing command, the solenoid valve is opened to dispense the wine for the wine taster to taste. The automatic wine dispenser is a wine by glass dispenser.

The present invention can be applied on and is not limited to the venues such as wine tasting parties, wine tasting galleries, wine tasting classes, restaurants, wine cellars and others.

The other characteristics and advantages of the present invention are described hereinafter, and parts of characteristics and advantages can be apparent from the specification or be understood by means of the embodiments of the present invention. The objectives and other advantages of the present invention are achieved and obtained by the specification, claims, and structures shown in the attached drawings.

The technical solution of the present invention is described further in detail accompanying with the below drawings and embodiments.

BRIEF DESCRIPTION OF THE DRAWINGS

The attached drawings with the reference of the embodiments are used to provide further understanding of the present invention, and as a part of description. It does not constitute a restriction to the present invention. In the attached figures.

Figure 1:
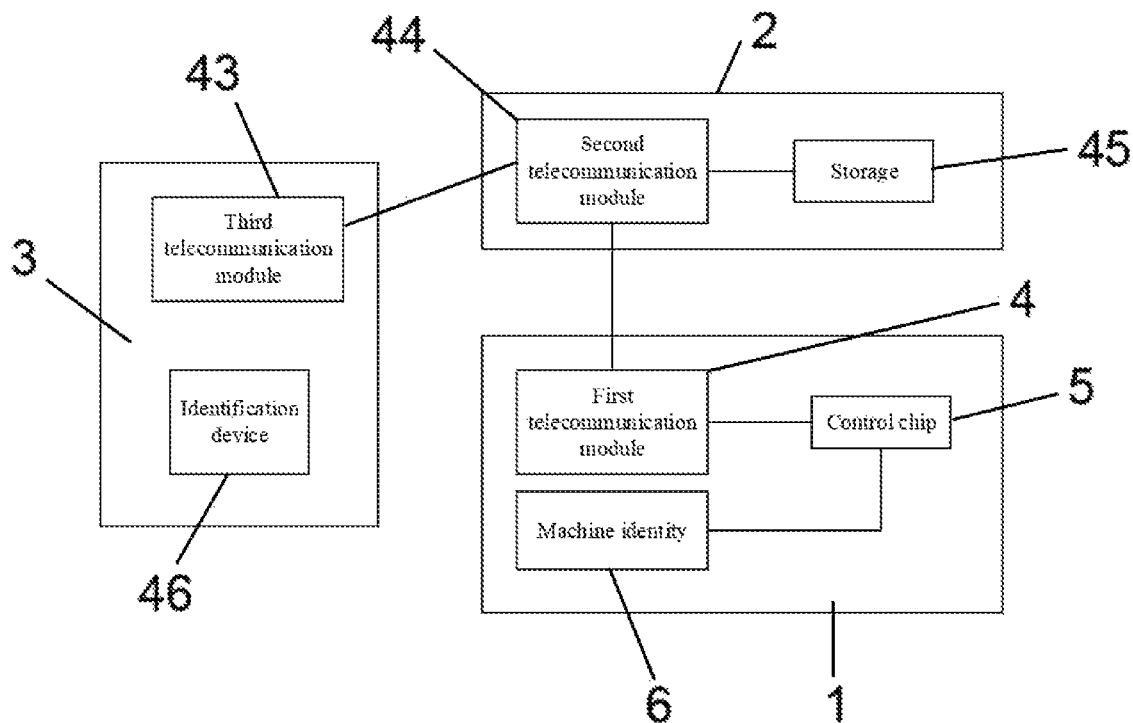
FIG. 1 is a schematic diagram showing the structure of a self-service wine tasting system according to the present invention.

In the figures: 1—automatic wine dispenser, 2—cloud server, 3—user terminal, 4—first telecommunication module, 5—control chip, 6—machine identity, 7—wine storage area, 8—wine glass area, 9—wine glass recycling area, 10—wine dispensing area, 11—display screen, 12—QR code reader, 13—machine code, 14—wine decanting device, 17—oxygen tank, 18—gas pump, 19—oxygen pipeline, 20—wine bottle, 21—wine output valve, 22—wine output pipeline, 23—guide pipe, 24—deflector, 27—cap body, 28—sealing ring, 29—bolt, 30—first groove, 31—opening hole, 32—locating block, 33—limiting bump, 34—second groove, 35—second opening, 36—gas inlet, 37—main pipeline, 38—bottle bump, 39—gas valve, 40—first opening, 42—filter, 43—third telecommunication module, 44—second telecommunication module, 45—storage, 46—identification device, 47—flowmeter, 48—wine empty detection device, 49—wine dispensing station, 52—solenoid valve, 53—pump.

DETAILED DESCRIPTION OF THE EMBODIMENTS

The preferred embodiments of the present invention are described hereinafter with reference to the drawings. It should be noted that the preferred embodiments described are only to illustrate and explain the present invention, rather than to limit the present invention.

Embodiment 1

A self-service wine tasting system includes the automatic wine dispenser 1, the cloud server 2 and the user terminal 3.

The automatic wine dispenser 1 includes the wine dispensing station 49, the machine identity 6 and the first telecommunication module 4. The first telecommunication module 4 is connected to the control chip 5 of the automatic wine dispenser 1.

The cloud server 2 includes the storage 45 and the second telecommunication module 44. The second telecommunication module 44 is in communication connection with the first telecommunication module 4. The storage 45 stores the wine storage information associated with the machine code 13 of each automatic wine dispenser 1.

The user terminal 3 includes the identification device 46 and the third telecommunication module 43. The third telecommunication module 43 is in communication connection with the second telecommunication module 44.

Wine taster scans the obtained wine tasting QR code by the QR code reader at the wine dispensing station of the automatic wine dispenser. The wine tasting QR code includes the network address of the identifying cloud server and the machine identity of the automatic wine dispenser. The automatic wine dispenser transmits the identified information including the machine code of the wine dispensing station to the cloud server via the first telecommunication module. The cloud server transmits a wine dispensing command to the automatic wine dispenser corresponding to the machine code in the identified information via the second telecommunication module and the first telecommunication module. The control chip of the automatic wine dispenser controls the wine dispensing station of the automatic wine dispenser to dispense the wine according to the wine dispensing command, so that the wine taster can get the wine to taste.

And then the wine taster uses his/her own user terminal (a mobile phone, a tablet, and other electronic device) to identify the wine tasting QR code and transmit the identified wine tasting QR code information and the terminal identity of the user terminal to the cloud server.

The storage of the cloud server stores the wine storage information associated with the machine code of each automatic wine dispenser and the wine dispensing command associated with the wine tasting QR code.

The cloud server after receiving the identified machine code, the wine tasting QR code information, the user terminal identity, which are transmitted from the user terminal, transmits the wine storage information of the wine dispensing station of the associated machine code to the user terminal. Then the wine taster gets the wine information, which is about his/her tasting wine. And he/she writes his/her tasting notes. Thereafter, the cloud server receives the messages, transmitted from the user terminal, which include user terminal identity, the tasting QR code, the time of received the tasting QR code, the wine storage information of the automatic dispensing station associated with the machine code. These are stored as the tasting records of the wine taster into the storage.

Later, if the wine taster wants to know his/her own wine tasting behavior, the wine taster can use the user terminal to transmit an information request to the cloud server via the third telecommunication module and the second telecommunication module. The information request includes the user terminal identity of the wine taster. After receiving the information request, the cloud server searches the wine tasting records associated with the user terminal identity of the information request among the recorded wine tasting records, and transmits the searched wine tasting records to the user terminal via the second telecommunication module and the third telecommunication module. The advantage is to facilitate the wine taster to review his/her own wine tasting records at any time without recording manually.

In addition, the user terminal transmits the obtained wine tasting notes (such as color, aroma, taste and personal preference of the wine) input by the wine taster during tasting, and the identified machine code of the automatic wine dispenser to the cloud server. The cloud server stores the above tasting notes with the above wine tasting record, which makes less confusion with the complete tasting records after tasting varieties of wines, and thereby reducing the mismatches between the wine tasting notes and the tasted wines.

Moreover, the cloud server generates the user tasting record according to the tasting notes associated with machine code transmitted from the user terminal (the user tasting record includes the machine identity, the receiving time and the wine storage information of this machine code). This let the manager of the automatic wine dispenser to obtain information on the usage of each automatic wine dispenser. The cloud server stores the above-mentioned tasting notes associated with the user terminal identity, making it convenient for the manager of the automatic wine dispenser to obtain the feedback of wine tasters after tasting the wines of the automatic wine dispenser.

The control chip in the present invention is implemented as a single chip microcontroller. Specifically, the single chip microcontroller is a STM32 controller of 32-bit RISC ARM. The single chip microcontroller is connected to a plurality of solenoid valves and a plurality of flowmeters, which correspond to a plurality of wine dispensing stations. When the single chip microcontroller is connected to a plurality of solenoid valves, each solenoid valve corresponds to the bottleneck of one bottle, achieving the physical open or close of the opening wine bottle. When the control chip receives a wine dispensing command, the solenoid valve is opened to dispense the wine for the wine taster to taste. The automatic wine dispenser is the wine by glass dispenser.

The present invention can be applied on and is not limited to the venues such as wine tasting parties, wine tasting galleries, wine tasting classes, restaurants, wine cellars and others.

Figure 2:
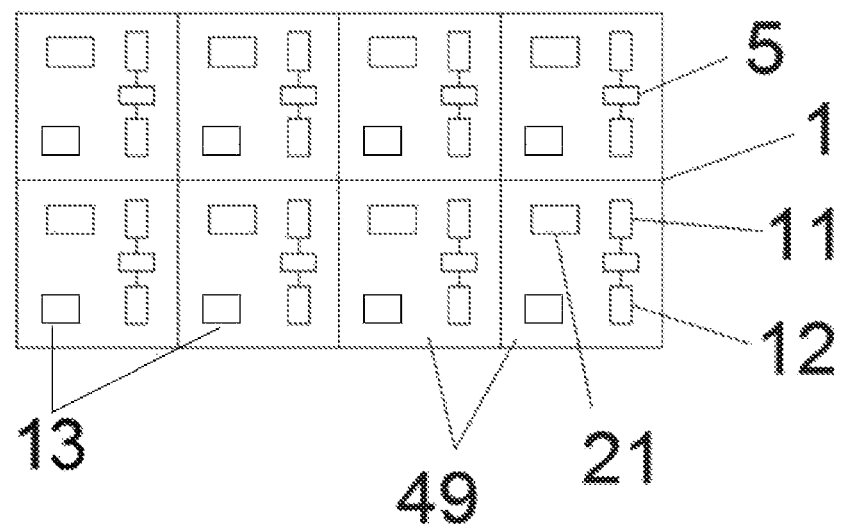
FIG. 2 is a schematic diagram showing the structure of a wine dispensing station of the self-service wine tasting system according to the present invention.

As shown in FIG. 2, it is a preferred technical solution for the purpose to let the automatic wine dispenser smoothly dispenses the wine for the wine taster to taste and to write his/her tasting notes. The automatic wine dispenser 1 is configured with a QR code reader 12. And the QR code reader 12 is electrically connected to the control chip 5 of the automatic wine dispenser 1. The identification device is the wine tasting QR code. The QR code reader is encoded to read the wine tasting QR code (The wine tasting QR code includes an activation command to activate the automatic wine dispenser, and the wine tasting QR code can be printed on papers, displayed on the user terminal or offered by the wine supplier to the user). The control chip transmits the QR code information to the cloud server via the first telecommunication module and controls the automatic wine dispenser to activate the dispense of the wine when the identified wine tasting QR code information matches with the pre-stored wine tasting QR code information.

The QR code information includes wine supplier, wine type, wine tasting code, wine tasting record of the wine taster and information stored by the wine taster. The wine tasting code is the QR code generated by the wine tasting coupon that the wine taster purchases from the wine supplier.

The information recorded by the wine taster includes, but is not limited to, the color, aroma, taste and personal preference of the wine, which can be compared with the history records. The information recorded by the wine supplier includes, but is not limited to, place of origin of wine, the wine ingredient, and the wine characteristics, food matched with the wine, etc. The information recorded by the wine supplier and the wine taster is stored in the storage of the cloud server 2.

Figure 3:
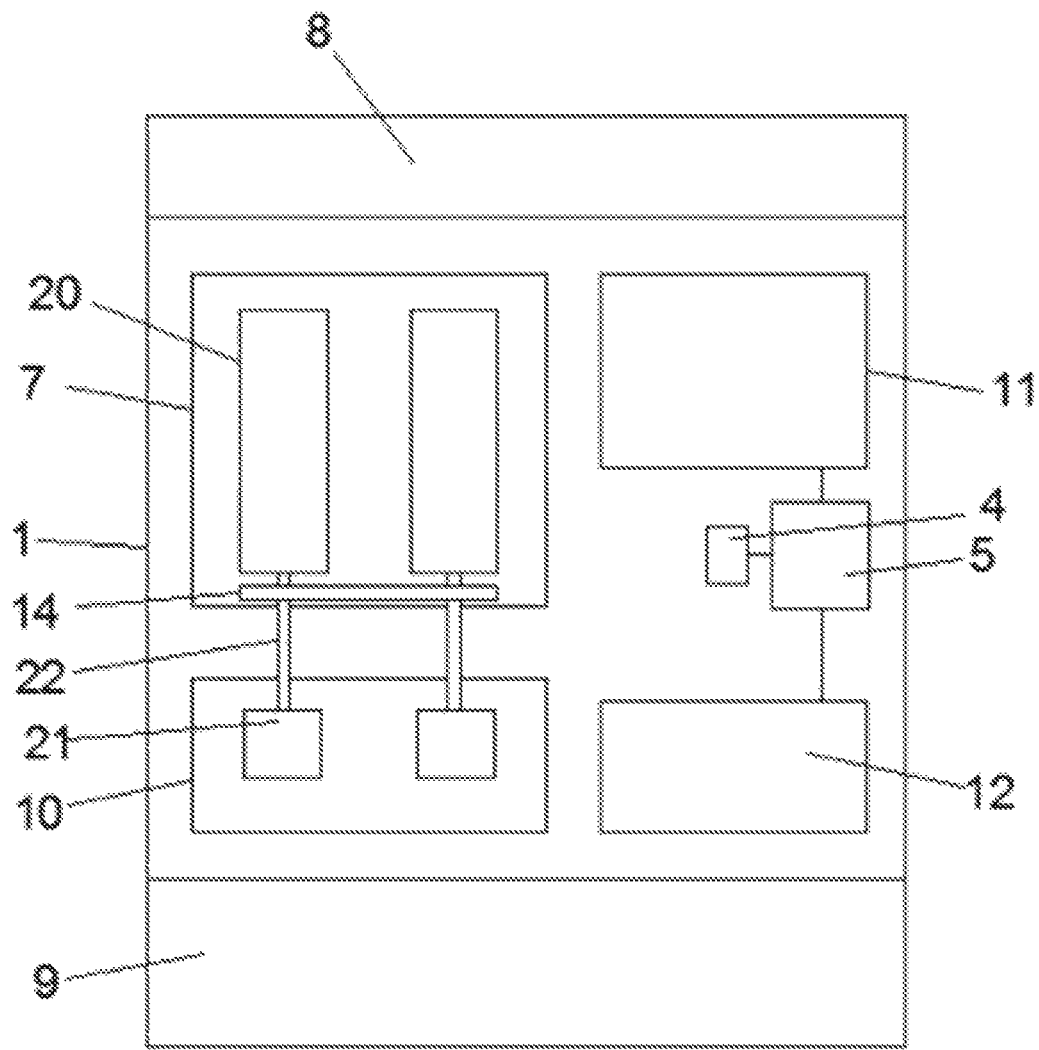
FIG. 3 is a schematic diagram showing the connection structure of a solenoid valve and a pump of the self-service wine tasting system according to the present invention.
Figure 4:
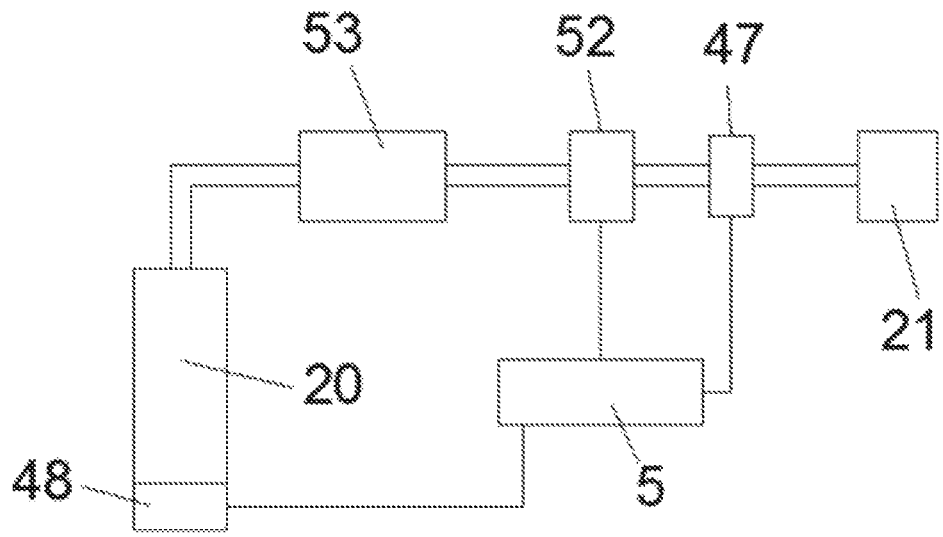
FIG. 4 is a schematic diagram showing the structure of a wine decanting device of the self-service wine tasting system according to the present invention.

As shown in FIG. 3, a plurality of wine dispensing stations 49 are arranged on the automatic wine dispenser 1. The solenoid valve 52 and the pump 53 are arranged to correspond to each wine dispensing station 49.

One end of the solenoid valve 52 is connected to the control chip 5.

The inlet of the pump 53 is connected to the bottleneck of the wine bottle 20 on the wine dispensing station 49. The outlet of the pump 53 is connected to the solenoid valve 52. The far end of the solenoid valve 52 from the pump 53 is connected to the wine output valve 21 of the automatic wine dispenser 1.

The power switch of the pump is connected to the control chip, and the control chip controls the power supply of the pump.

When the control chip receives a wine dispensing command, the solenoid valve and the pump are actuated by the control chip and start working. The pump pumps the wine in the wine bottle into the solenoid valve. After the solenoid valve is opened, the wine flows to the wine outlet port through the solenoid valve for the wine taster to taste.

As shown in FIG. 3, the wine dispensing station 49 further includes the flowmeter 47 and the wine empty detection device 48. The metering device 47 and the wine empty detection device 48 are connected to the control chip 5, respectively, one by one. The flowmeter is configured to measure the volume of flow of the dispensed wine. The wine empty detection device is configured to detect and transmit the information of the wine bottle to the control chip after each dispensing. The control chip determines whether the wine bottle is empty according to the information from the wine empty detection device. If the wine bottle is determined as empty, the dispensing operation is suspended. The wine empty detection device is a weighing sensor. The weighing sensor is in communication connection with the control chip. The information of the full load and the empty bottle is input in the control chip in advance for the purpose to determine the wine bottle is empty As shown in FIG. 2, the automatic wine dispenser 1 is configured with 15-200 wine dispensing stations 49. The plurality of wine dispensing stations are arranged for a plurality of wine tasters to taste the wine at the same time. Each wine dispensing station 49 is provided with the corresponding unique machine code, ensuring that when the wine bottle is empty, the information of the corresponding wine dispensing station is transmitted to the cloud sever via the control chip and the first telecommunication module. That is for the purpose of informing the wine supplier to check and replace the empty wine bottle in time.

As shown in FIG. 3, the flowmeter 47 is arranged between the wine output valve 21 and the solenoid valve 52. The wine empty detection device 48 is arranged on the bottom of the wine bottle 20. The flowmeter is used to measure and monitor the volume of dispensed wine during the wine dispensing, ensuring that the volume of the wine dispensed to the wine taster is the same as the volume of the purchase. This minimizes the wastages by dispensing the exact volume of wine that the wine taster requests.

Embodiment 2

As shown in FIG. 2, the display screen is arranged on each wine dispensing station 49. The display screen is connected to the control chip. The wine dispensing station is further provided with a second storage. The second storage is connected to the control chip. The display screen is arranged for the wine taster to check the wine information of the wine station during the process of taking wine, scanning the tasting QR code and waiting the wine to dispense. The wine storage information can be stored in the storage of the cloud server or on the second storage.

The user terminal 3 includes the third storage and the third storage is encoded to store the information input by the user and the information of the identification device 46. The third storage is configured to store the information input by the user and the information of the electronic identification device.

In another embodiment, the self-service wine tasting system further includes a wine tasting method. The steps are listed as follows:

Step 1, the wine taster uses the QR code reader of the wine dispensing station to scan the identification device carried from the user terminal.

Step 2, the QR code reader encodes and transmits the scanned information to the control chip. When the scanned information is matched with the content stored in the storage, the control chip controls the wine dispensing station to dispense the wine.

Step 3, after the wine dispensing station dispenses the wine, the information of the dispensed wine is transmitted to the cloud server via the first telecommunication module and the second telecommunication module.

Step 4, the cloud server stores the received information of the dispensed wine in the storage.

Step 5, after tasting the wine, the wine taster inputs the tasting notes into the third storage of the user terminal. The third storage transmits the tasting notes to the storage of the cloud server to store via the third telecommunication module and the second telecommunication module.

Specific steps: the wine taster uses the identification device of the user terminal, such as a mobile phone, a tablet computer, etc., to identify the machine identity (e.g., a QR code containing the machine identity) of the automatic wine dispenser. When the identified information of the machine identity is matched to the storage information in storage, the control chip controls the automatic wine dispenser to dispense the wine and then the wine taster can get the wine to taste. After tasting the wine, the wine taster inputs the tasting notes into the user terminal. The tasting notes are stored in the third storage and is transmitted to the second telecommunication module of the cloud server via the third telecommunication module. The second telecommunication module stores the received tasting information in the storage of the cloud server, so that the wine taster and the wine supplier can view the stored tasting information. The automatic wine dispenser can still dispense the wine when the cloud server is off-line, ensuring that the wine taster can still taste the wine normally when the cloud server and the automatic wine dispenser are off-line.

Embodiment 3

As shown in FIGS. 3-8, impurities, tannin and other substances are produced during the fermentation process of the wine, which influence the taste of the wine. Thus, it is necessary to decant the wine before the wine is tasted to reduce the impurities, thereby retaining the taste of the wine. In order to retain the taste of the wine during the tasting process, the preferred technical solution is adopted as follows. The automatic wine dispenser 1 further includes the wine storage area 7, the wine glass area 8, the wine glass recycling area 9, the wine dispensing area 10 and the display screen 11. The display screen 11 is configured to display and operate the pre-set information stored in the cloud server 2. The wine storage area 7 is used for settling the wine bottle 20. The wine dispensing area 10 is connected to the wine storage area 7 through the wine output pipeline 22. The wine glass recycling area 9 is arranged under the wine storage area 7, and the wine glass area 8 is arranged above the wine storage area 7. The display screen 11 is arranged at the right side of the wine storage area 7. The QR code reader 12 is arranged under the display screen 11. In order to make it convenient for several wine tasters to take the wines simultaneously to taste, or to make it possible for a number of different wine suppliers to offer numerous tasting positions for wine tasters to taste the wines, as a preferred technical solution, a plurality of automatic wine dispensers and a plurality of wine storage areas 7 are arranged, allowing different wine suppliers to store different types of wines, which makes it less likely that the wine tasters to queue up.

During the process, the wine taster purchases the wine tasting coupon from the wine suppliers, wherein the tasting coupon is a unique QR code with the wine tasting code. The wine taster identifies the wine tasting coupon by the QR code reader of the wine dispensing station of the automatic wine dispenser. When the QR code of the wine tasting coupon is matched with the pre-stored information in the cloud wine tasting system, the control chip activates the automatic wine dispenser to dispense the wine for the wine taster to taste.

The control chip can be set as STM32F10X series single chip microcontroller. The single chip microcontroller can be connected to one solenoid valve or can be connected to a plurality of solenoid valves. When the single chip microcontroller is connected the plurality of solenoid valves, each solenoid valve corresponds to an unsealed wine bottle in one-to-one manner, achieving the purpose of taking control of the physical operation of open and close of the unsealed wine bottle. After the wine taster selects the wine to be tasted on the wine dispensing station, the single chip microcontroller starts the solenoid valve of the corresponding wine bottle, so that the wine taster can take a wine glass/sake cup on the wine glass area to get the wine to taste. When finishing tasting, the wine taster puts the used wine glass on the wine glass recycling area, making it convenient for the service provider to recycle and gather the used wine glasses for cleaning.

The wine tasting coupon can be printed as a paper QR code, or can be displayed as a QR code on the user terminal of the wine taster. The user terminal includes but is not limited to a mobile phone, a tablet and other electronic devices. The wine taster uses the user terminal to input the personal comment and the tasting notes. During the tasting process, on every tasting, the wine taster can record and give the feedback of the tasted wine by the user terminal. The feedback of the wine taster is transmitted to the cloud wine tasting system by the user terminal. The wine suppliers can recommend the wine that is suitable for the personal preferences of the wine taster according his/her wine tasting records. Therefore, the objective of keeping a more complete and precise personal wine tasting notes is achieved, the ambiguous records of the wine taster after wine tasting are reduced. The satisfaction of the wine taster about the wine tasting party is improved. The effects of the wine tasting party is prolonged. Meanwhile, the likelihood that the wine taster tastes the same wine more than once is reduced.

Figure 5:
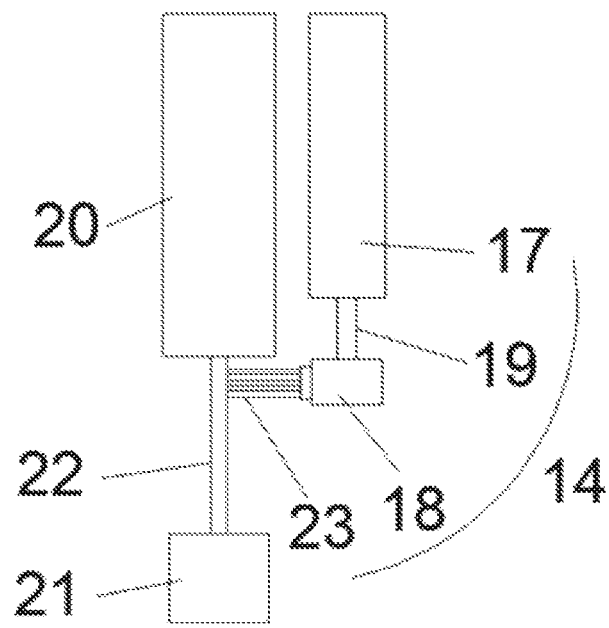
FIG. 5 is a schematic diagram showing the structure of a deflector of the self-service wine tasting system according to the present invention.
Figure 6:
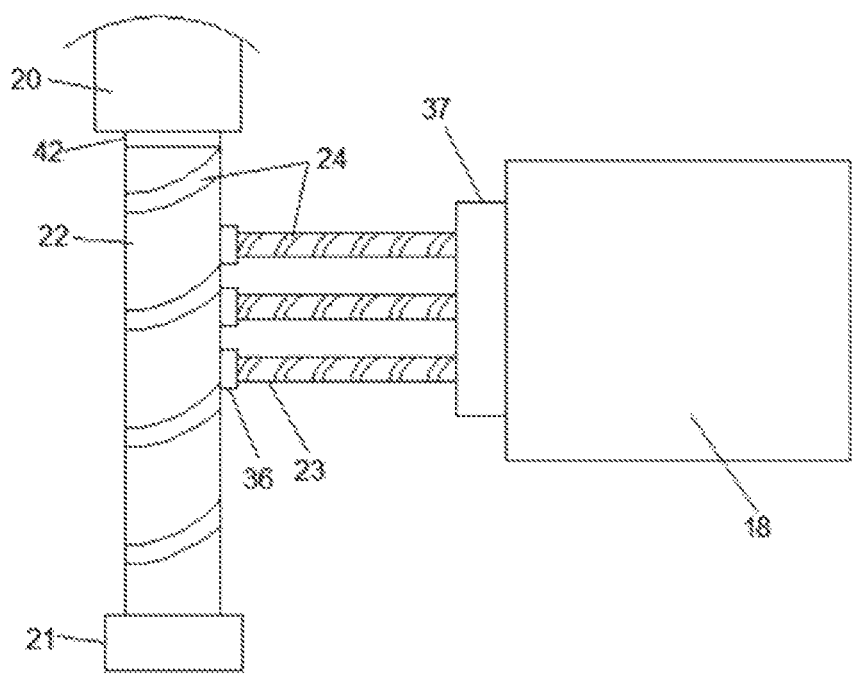
FIG. 6 is a schematic diagram showing the structure of a cap body of the self-service wine tasting system according to the present invention.
Figure 7:
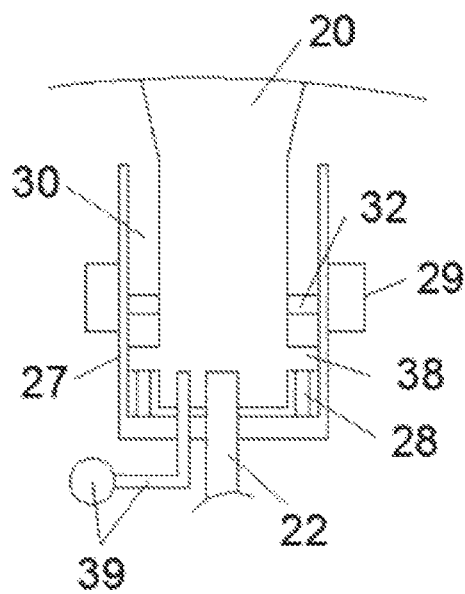
FIG. 7 is a schematic diagram showing the structure of a limiting bump of the self-service wine tasting system according to the present invention.

As shown in FIGS. 5-7, the automatic wine dispenser 1 further includes the wine decanting device 14. The wine decanting device 14 includes the oxygen tank 17, the gas pump 18 and the oxygen pipeline 19. One end of the oxygen pipeline 19 is connected to the oxygen tank 17 and the other end of the oxygen pipeline 19 connected to the gas pump 18. The gas outlet of the gas pump 18 is connected to the wine output pipeline 22 of the automatic wine dispenser 1. One end of the wine output pipeline 22 is connected to the wine bottle 20 and the other end of the wine output pipeline 22 connected to the wine output valve 21. The wine decanting device 14 is arranged near the bottleneck of the wine bottle 20.

During the operation, the oxygen in the oxygen tank is delivered to the gas pump through the gas pipeline. The oxygen in the oxygen tank is continuously pumped into the main pipeline 37 by the gas pump and the oxygen is then diverted to the gas inlet of the wine output pipeline via the main pipe. When the wine flows from the wine bottle and passes through the wine output pipeline, the oxygen in the wine output pipeline can fully oxidize the wine or retaining the taste of wine in the wine output pipeline, thus oxidizing tannin in the wine or retaining the taste, achieving the objective of decanting the wine and improving its taste.

As shown in FIG. 6, in order to further retaining the taste of the wine during the tasting process, the preferred technical solution is adopted as follows. A plurality of guide pipes 23 are arranged between the gas pump 18 and the wine output pipeline 22. The plurality of guide pipes 23 are connected to the gas outlet of the gas pump 18 through the main pipeline 37. The spiral deflector 24 is arranged on the inner wall of the guide pipe 23 and the inner wall of the wine output pipeline 22. The deflector 24 penetrates the inner wall of the guide pipe 23 and the inner wall of the wine output pipeline 22, respectively. A plurality of gas inlets 36 are arranged on the wine output pipeline 22, and the gas inlet 36 connected to the guide pipe 23.

The filter 42 is arranged on the end of the wine output pipeline near the wine bottle. The filter 42 is a stainless steel filter screen. The number of mesh count of the stainless steel filter screen is between 200 to 1000. The impurities in the wine can be filtered by using the filter, which further improves the taste of the wine. The deflector on the wine output pipeline can extend the flow distance of the wine in the wine output pipeline, and the deflector in the guide pipe can slow down the flow speed of the oxygen in the guide pipe, so that the wine can be oxidized quickly or retained the genuine taste after flowing out, thereby quickly oxidizing the tannin or retained to be genuine taste to achieve decanting the wine and improving its taste.

Figure 8:
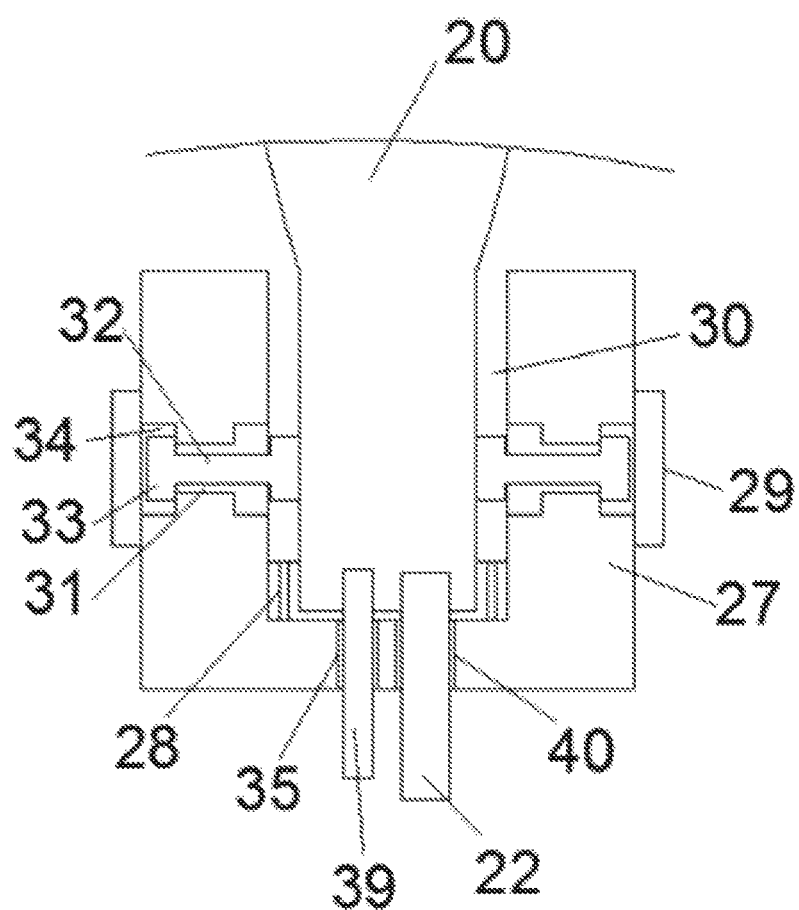
FIG. 8 is a schematic diagram showing the structure of a first bottleneck of the self-service wine tasting system according to the present invention.

As shown in FIGS. 7-8, in order to ensure that the wine is not spoiled resulting from not being finished in time after opening the wine bottle and to prevent the loss of taste because the wine is exposed to the gas for a long time, the preferred technical solution is adopted as follows. The sealing cap is arranged at the end of the wine output pipeline 22 connected to the wine bottle 20. The sealing cap includes the cap body 27, the sealing ring 28 and the bolt 29. The cap body 27 is a cylindrical structure, wherein the first groove 30 is arranged in the cap body. The sealing ring 28 is arranged at the bottom of the first groove 30, and the sealing ring 28 is a ring structure. The sealing ring 28 is configured to seal the bottleneck of the wine bottle 20. A plurality of opening holes 31 are arranged at intervals on the cap body 27 along the circumference. The locating block 32 is arranged in each opening hole 31. The thread is arranged on the outer wall of the cap body 27 along the circumference to fix the bolt 29.

During the operation, the first groove 30 of the sealing cap is sleeved on the bottleneck of the wine bottle. The bolt can move up and down on the outer circumference of the cap body by the thread. The bottle bump of the wine bottle and the edge of the bottleneck of the wine bottle are sealed by pressing the sealing stripe. The locating block 32 is clamped at the bottle bump 38. The bolt is moved to the outside of the locating block 32, so that the objective that the sealing cap is fixed on the bottleneck of the wine bottle is achieved when the locating block is clamped at the bottle bump 38, preventing the spoiled taste of the wine due to excessive contact with gas or the contamination of the wine due to the dust and abnormal smell.

When the wine in the wine bottle is finished, the bolt is moved away from the position of the locating block, and the locating blocks are pulled outward, respectively, so that the locating block is released from the clap of the bottle bump 38. The sealing cap is removed from the bottleneck of the wine bottle and can be installed on the bottleneck of the new wine bottle to continue use, achieving the objective of recycling.

As shown in FIG. 8, in order to facilitate the sealing cap to seal the wine bottle and snap-fit on the bottleneck of the wine bottle, the preferred technical solution is adopted as follows. The limiting bump 33 is arranged on both ends of the locating block 32, and the limiting bump 33 is configured for the locating block 32 to move back and forth in the opening hole 31. The second groove 34 is arranged at both ends of the opening hole 31. The second groove 34 is configured to cooperate with the limiting bump 33 when the limiting bump 33 moves back and forth. The limiting bump 33 is arranged at both ends of the locating block, and the second groove 34 is arranged at both ends of the opening hole 31, so that by means of the limiting bump and the second groove, the locating block can move back and forth in the opening hole 31 to prevent loss of the locating block.

As shown in FIG. 8, in order to ensure a smooth flow of the wine from the wine bottle, while the wine bottle is sealed, when the wine in the wine bottle flows out, the inside of the wine bottle is under negative pressure. If bumping happens in the automatic wine dispenser under negative pressure during transportation, the wine bottle may break. To prevent breakage, the preferred technical solution is adopted as follows. The first opening 40 for the wine output pipeline 22 to dispense the wine is arranged on the cap body 27. The second opening 35 is further arranged on the cap body 27, and the second opening 35 is connected to the gas valve 39. The first opening 40 is connected to the wine dispense pipeline, and the second opening is connected to the gas valve. When a portion of the wine in the wine bottle is finished, the inside of the wine bottle is under negative pressure, and meanwhile the gas pressure in the wine bottle can be adjusted by adjusting the gas valve to prevent breakage caused by the negative pressure.

Obviously, those skilled in the art can make various changes and modifications to the present invention without departing from the essence and scope of the present invention. In this way, if the changes and modifications of the present invention fall within the scope of the claim of the present invention and its equivalent technology, the present invention is also intended to include these changes and modifications.

What is claimed is:

1. A self-service wine tasting system, comprising at least one automatic wine dispenser, a cloud server and at least one user terminal; wherein, the at least one automatic wine dispenser comprises a machine identity and a first telecommunication module, and the first telecommunication module is connected to a control chip of the at least one automatic wine dispenser;

the cloud server comprises a storage and a second telecommunication module; the second telecommunication module is in communication connection with the first telecommunication module, the storage stores wine storage information associated with the machine identity of the at least one automatic wine dispenser; and the at least one user terminal comprises an identification device and a third telecommunication module, wherein the third telecommunication module is in communication connection with the second telecommunication module;

wherein, the at least one automatic wine dispenser further comprises a plurality of wine dispensing stations, and each of the plurality of wine dispensing stations a quick response (QR) code reader; the QR code reader is electrically connected to the control chip of the at least one automatic wine dispenser; a solenoid valve; and a pump;

wherein, a first end of the solenoid valve is connected to the control chip; an inlet of the pump is connected to a bottleneck of a wine bottle on one of the plurality of wine dispensing stations; an outlet of the pump is connected to the solenoid valve; a second end of the solenoid valve is spaced from the pump and is connected to a wine output valve of the at least one automatic wine dispenser; a number of the plurality of wine dispensing stations arranged on the at least one automatic wine dispenser is 15-200; each of the plurality of wine dispensing stations is provided with a unique machine code; a display screen is arranged on each of the plurality of wine dispensing stations, and the display screen is connected to the control chip.

2. The self-service wine tasting system of claim 1, wherein, the at least one user terminal further comprises a third storage, and the third storage is configured to store tasting notes input by a wine taster and information of the identification device; and the identification device is a wine tasting QR code.

3. The self-service wine tasting system of claim 1, wherein, the each wine dispensing station further comprises a flowmeter and a wine empty detection device; the flowmeter and the wine empty detection device are connected to the control chip, respectively; and the flowmeter is arranged between the wine output valve and the solenoid valve, and the wine empty detection device is arranged at a bottom of the wine bottle.

4. A self-service wine tasting system, comprising at least one automatic wine dispenser, a cloud server and at least one user terminal; wherein, the at least one automatic wine dispenser comprises a machine identity and a first telecommunication module, and the first telecommunication module is connected to a control chip of the at least one automatic wine dispenser;

the cloud server comprises a storage and a second telecommunication module; the second telecommunication module is in communication connection with the first telecommunication module, the storage stores wine storage information associated with the machine identity of the at least one automatic wine dispenser; and the at least one user terminal comprises an identification device and a third telecommunication module, wherein the third telecommunication module is in communication connection with the second telecommunication module;

wherein, the at least one automatic wine dispenser further comprises a wine decanting device; the wine decanting device comprises an oxygen tank, a gas pump and an oxygen pipeline; a first end of the oxygen pipeline is connected to the oxygen tank, and a second end of the oxygen pipeline is connected to the gas pump; and a gas outlet of the gas pump is connected to a wine output pipeline of the at least one automatic wine dispenser; a first end of the wine output pipeline is connected to a wine bottle, and a second end of the wine output pipeline is connected to a wine output valve; the wine decanting device is arranged next to a bottleneck of the wine bottle.

5. The self-service wine tasting system of claim 4, wherein, a plurality of guide pipes are arranged between the gas pump and the wine output pipeline; the plurality of guide pipes are connected to the gas outlet of the gas pump through a main pipeline; a spiral deflector is arranged on an inner wall of each guide pipe of the plurality of guide pipes and an inner wall of the wine output pipeline; the spiral deflector penetrates the inner wall of the each guide pipe of the plurality of guide pipes and the inner wall of the wine output pipeline, respectively; and a plurality of gas inlets are arranged on the wine output pipeline, and each gas inlet of the plurality of gas inlets is connected to the each guide pipe of the plurality of guide pipes.

6. The self-service wine tasting system of claim 4, wherein, a sealing cap is arranged at the first end of the wine output pipeline; the sealing cap comprises a cap body, a sealing ring and a bolt; the cap body is a cylindrical structure, wherein a first groove is arranged in the cap body; the sealing ring is arranged at a bottom of the first groove, and the sealing ring is a ring structure; the sealing ring is configured to seal the bottleneck of the wine bottle; and a plurality of opening holes are arranged at intervals on the cap body along a circumference of the cap body; a locating block is arranged in each opening hole of the plurality of opening holes; a thread is arranged on an outer wall of the cap body along the circumference of the cap body to fix the bolt.

7. The self-service wine tasting system of claim 6, wherein, a limiting bump is arranged on both ends of the locating block, and the limiting bump is configured for the locating block to move back and forth in the each opening hole of the plurality of opening holes; a second groove is arranged at both ends of the each opening hole of the plurality of opening holes, and the second groove is configured to cooperate with the limiting bump when the limiting bump moves back and forth.

8. The self-service wine tasting system of claim 7, wherein, a first opening for the wine output pipeline to dispense wine is arranged on the cap body; a second opening is arranged on the cap body, and the second opening is connected to a gas valve.

* * * * *